(12) United States Patent
Heed

(10) Patent No.: US 8,774,430 B2
(45) Date of Patent: Jul. 8, 2014

(54) LINEAR INTERLEAVED MAGNETIC MOTOR AND LOUDSPEAKER TRANSDUCER USING SAME

(71) Applicant: Thomas Paul Heed, Ann Arbor, MI (US)

(72) Inventor: Thomas Paul Heed, Ann Arbor, MI (US)

(*) Notice: Subject to any disclaimer, the term of this patent is extended or adjusted under 35 U.S.C. 154(b) by 0 days.

(21) Appl. No.: 13/691,819

(22) Filed: Dec. 2, 2012

(65) Prior Publication Data

US 2013/0142364 A1    Jun. 6, 2013

Related U.S. Application Data

(60) Provisional application No. 61/630,011, filed on Dec. 2, 2011.

(51) Int. Cl.
| | | |
|---|---|---|
| H04R 25/00 | (2006.01) | |
| H04R 1/00 | (2006.01) | |
| H04R 9/06 | (2006.01) | |
| H04R 11/02 | (2006.01) | |
| H01F 7/08 | (2006.01) | |
| H01F 7/02 | (2006.01) | |
| H02K 41/02 | (2006.01) | |
| H02K 3/26 | (2006.01) | |
| H04R 9/02 | (2006.01) | |
| H02K 41/035 | (2006.01) | |
| H04R 1/40 | (2006.01) | |

(52) U.S. Cl.
CPC ............... *H04R 9/025* (2013.01); *H02K 41/02* (2013.01); *H04R 1/403* (2013.01); *H02K 3/26* (2013.01); *H04R 9/06* (2013.01); *H02K 41/0356* (2013.01)
USPC ........... 381/182; 381/184; 381/396; 381/412; 381/421; 381/423; 335/222; 335/297; 335/306

(58) Field of Classification Search
CPC .......... H04R 11/00; H04R 13/02; H04R 7/12; H04R 9/025; H04R 9/02; H04R 9/06; H04R 2209/022; H04R 7/04; H04R 9/047; H04R 9/063; H01F 2007/1676; H01F 7/066; H01F 7/0278; H01F 41/0213; H02K 41/0356; H02K 33/18; G01R 33/383
USPC ......... 381/182, 184, 396, 412, 421, 423, 408, 381/419, 420, 422, 431; 335/222, 297, 306
See application file for complete search history.

(56) References Cited

U.S. PATENT DOCUMENTS

| | | | | |
|---|---|---|---|---|
| 3,013,905 | A * | 12/1961 | Gamzon ....................... | 381/427 |
| 3,922,504 | A * | 11/1975 | Kishikawa et al. .......... | 381/408 |
| 3,997,739 | A * | 12/1976 | Kishikawa et al. .......... | 381/408 |
| 4,808,955 | A * | 2/1989 | Godkin et al. ............... | 335/222 |
| 4,987,398 | A * | 1/1991 | Bessho ........................ | 335/299 |
| 5,003,610 | A * | 3/1991 | Adachi et al. ............... | 381/431 |
| 5,142,260 | A * | 8/1992 | House .......................... | 335/222 |
| 5,317,642 | A * | 5/1994 | Danley et al. ............... | 381/182 |
| 5,345,206 | A * | 9/1994 | Morcos ....................... | 335/222 |
| 5,394,132 | A * | 2/1995 | Poil ............................. | 335/232 |

(Continued)

*Primary Examiner* — Duc Nguyen
*Assistant Examiner* — Sean H Nguyen
(74) *Attorney, Agent, or Firm* — Thomas Heed

(57) ABSTRACT

A linear interleaved magnetic motor in which the B-field flows between a plurality of motor cell elements, creating a long, serpentine gap. The motor is used with at least one flex circuit as a drive coil. The motor can be used as a drive motor for a loudspeaker transducer. Multiple loudspeaker transducers can be connected together to make a loudspeaker frame or system.

17 Claims, 11 Drawing Sheets

(56) References Cited

U.S. PATENT DOCUMENTS

| | | | |
|---|---|---|---|
| 5,479,145 A * | 12/1995 | Kalsi | 335/297 |
| 6,185,310 B1 * | 2/2001 | Kermani et al. | 381/431 |
| 6,654,475 B2 * | 11/2003 | Nakaso | 381/396 |
| 6,654,476 B1 * | 11/2003 | Guenther | 381/407 |
| 6,760,462 B1 * | 7/2004 | Thigpen | 381/431 |
| 6,845,166 B2 * | 1/2005 | Hara et al. | 381/399 |
| 6,937,124 B1 * | 8/2005 | Nakamura et al. | 335/222 |
| 6,937,127 B2 * | 8/2005 | Oster | 335/296 |
| 7,316,290 B2 * | 1/2008 | Hutt et al. | 181/176 |
| 7,517,721 B2 * | 4/2009 | Ito et al. | 438/106 |
| 7,525,403 B2 * | 4/2009 | Kim | 335/222 |
| 7,912,241 B1 * | 3/2011 | Graber | 381/431 |
| 2006/0151237 A1 * | 7/2006 | Oxford et al. | 181/199 |
| 2007/0127767 A1 * | 6/2007 | Croft et al. | 381/422 |
| 2008/0019558 A1 * | 1/2008 | Simidian et al. | 381/408 |
| 2008/0042790 A1 * | 2/2008 | Kim et al. | 335/222 |
| 2010/0007215 A1 * | 1/2010 | Sakuma | 307/104 |
| 2011/0074231 A1 * | 3/2011 | Soderberg | 310/44 |

* cited by examiner

LINEAR INTERLEAVED MAGNETIC MOTOR AND LOUDSPEAKER TRANSDUCER USING SAME

This is a non-provisional utility patent application claiming continuity and benefit of filing date from provisional patent application 61/630,011, filed Dec. 2, 2011.

FIELD OF INVENTION

This invention relates to electro-mechanical motors, specifically linear magnetic motors, and their application to loudspeaker transducers.

BACKGROUND OF INVENTION

In order for electrical energy to be useful to the end-user, there must be a means for converting electrical energy into mechanical energy, and vice versa. Transducers are the class of devices which convert one form of energy into another. Perhaps the most important and prevalent category of transducers are those obeying Lorentz' Force Function (sometimes called the LaPlace Force), F=B X li, where F is the Force, B is the magnetic field, I is the length of current-carrying wire in the magnetic field, i is the instantaneous current in the wire, and X is a cross-product operator. The Lorentz Force Function obeys Fleming's left-hand rule for motors: an instantaneous current, i, passing through a length of wire, I, in an orthogonal magnetic field, B, will produce a force, F, orthogonal to both the current and the magnetic field.

At the core of transducers obeying Lorentz's Force Function is a magnetic motor. A magnetic motor is composed of a permanent or electro-magnet, metal components to complete a magnetic circuit, and a coil of wire, called a drive coil. The magnet and metal components are arranged in such a way that they create a narrow air-gap between north-magnetized and south-magnetized metal parts. The air gap is typically cylindrical. The coil of wire is designed to move in the magnetic gap, in proportion to the supplied current. Magnetic motors can either generate linear (also called reciprocal) or radial motion. The present invention and disclosure will focus on linear magnetic motors.

Linear magnetic motors are an integral part of many electronics and communications products including, but not limited to, sensors, scales, actuators, vibration tables, paint shakers, microphones and loudspeakers.

For most linear magnetic motors, the fundamental topology of their design has remained relatively static for decades. Due to their antiquated design topology, current, state-of-the-art, linear magnetic motors are expensive, inefficient, and variable under load. In almost every application, the wire in a magnetic motor has a significant thermal rise. In many applications, the working temperature of the wire is around 180° C. (300° F.). At 180° C., the resistivity of the wire is about double that of room temperature, meaning that half of the usable power is wasted as Joule heat, before any efficiency calculations are even made. An example of the poor efficiency of currently available linear magnetic motors is the loudspeaker, which is often only 1% efficient, meaning that most of the supplied energy is wasted as heat. As a result, consumers buy larger amplifiers, such as a 100 Watt/Channel amplifier, when they only want 1-2 Watts of acoustic power.

The end-user of a linear magnetic motor experiences these inefficiencies as added cost and degraded performance. In order to squeeze the maximum performance out of the existing linear magnetic motor technology, many engineers have resorted to using expensive, but very strong, neodymium magnets. Using expensive neodymium magnets, while burning off half of the available energy as Joule heat, adds cost upon cost. An efficient linear magnetic motor, capable of using ceramic magnets rather than neodymium magnets, could easily reduce the overall cost to the end user of transducers built with linear magnetic motors by up to 50%. Such a large amount of waste from such a ubiquitous class of devices represents a unique opportunity to reduce cost and improve performance, saving society substantial energy and resources.

In addition to cost and performance issues, current magnetic motor transducers are subject to supply interruption. As discussed, one of the few technological innovations in magnetic motors over the past three decades has been the introduction of high-power, but expensive, neodymium magnets. China controls 97% of the world's supply for neodymium, with up to 70% of the world's supply of neodymium coming from a single, open-air mine in Inner Mongolia, the massive Baiyun Obo mine. The world's supply of neodymium could be easily interrupted if that one mine experiences an earthquake, transportation disruptions, a disease epidemic, or labor unrest. Single-source commodities always pose a significant threat of disruption or manipulation, meaning that producers of linear magnetic motors are highly susceptible to a disruption at Baiyun Obo When compared with the existing technology, a linearly interleaved magnetic motor ("LIMM") offers substantially improved performance and a smaller package, while using ceramic, rather than neodymium, magnets. The design magnetically gangs together two or more individual magnetic motor circuits, creating at least two long, serpentine, linear air-gaps. In order to take advantage of the long, serpentine gaps, this innovation uses a flex circuit coil which is bent or folded as many as 40 times. By using a flex circuit to regulate resistance and impedance, using combinations of series and parallel traces, this technology yields an unequaled motive-force-to-mass ratio and operates with a very small thermal rise.

A loudspeaker is a transducer which converts an electric signal into sound waves. A perfect transducer is one which is linear and time-Invariant ("LTI"), has a unit impulse response in the time domain, and a frequency response which is flat and extends, in frequency, from DC to daylight. The current home theatre, automotive, and professional loudspeaker markets are dominated by electro-dynamic transducers, which follow the same basic design that Peter Jensen patented in 1927. Electro-dynamic loudspeaker transducers fall far short of an LTI response. The chief complaint about loudspeakers using electro dynamic transducers are they have significant thermal compression, wasting almost all of the electrical energy they receive; this makes them extraordinarily inefficient; as a result, they are over-sized, creating room clutter; and they have too much wiring. Additionally, when mounting such speakers to the wall, for use in a home theatre system, they are difficult to mount; modern wall-mounted or recess-mounted loudspeakers, especially soundbars, can be "beamy" or objectionably directional; they do not seal low frequency energy well; and, generally speaking, the thinner speakers tend to perform worse.

SUMMARY OF THE INVENTION

The LIMM is a new magnetic motor topology that overcomes the drawbacks inherent in current, state-of-the-art linear magnetic motors. A motor cell is a complete magnetic circuit, having a permanent or electro-magnet, ferrous metal connected to the north pole of the magnet and ferrous metal connected to the south pole of the magnet. The ferrous metal elements are arranged such that they create a narrow, high B-field, air-gap. Typically, the air-gap is cylindrical. The LIMM uses two or more motor cells that are ganged, or interleaved, together. In the current preferred embodiment, the LIMM is composed of two motor cells that have radiator-like fins or fingers extending out from a ceramic bar magnet. In a single motor cell, the fins or fingers are separated by several millimeters, creating a rather poor magnetic circuit. However, when the two motor cells are brought into close proximity, with the north ferrous metal of one motor cell in close proximity to the south ferrous metal of the other motor cell, it creates two very long and efficient air-gaps, one on top and one on the bottom.

In order to fully utilize the increased gap length in the magnetic field path, the drive coil is fabricated with modern flex circuit technology. A flexible circuit is defined as, "a patterned arrangement of printed circuitry and components that utilize flexible base material with or without flexible coverlay." Flex circuits are used in a wide variety of electronics applications, such as cellphones to airplanes to automobiles. However, one has never been used as a magnetic motor drive coil in the configuration disclosed here. Flex circuits are usually composed of one or more dielectric or base layers; an adhesive, or an adhesiveless lamination process, to bind the dielectric layers together; solder; and, if desired, a coverlay. The base material is a thin polymer film that, in most circumstances, provides the primary physical and electrical characteristics of the flex circuit.

For most typical circuit applications, the base material should be dimensionally stable, thermally resistant, and chemically resistant, with minimal dielectric constant, minimal loss tangent, and minimal water uptake. Like all engineered products, cost is also a significant consideration. For a LIMM application, the need for minimal loss tangent is not important. The loss tangent is related to the speeds achievable using a given film. No applications of the LIMM would require higher frequencies than the 20 kHz typically specified for loudspeakers. Relatively speaking, magnetic motors are slow-moving compared to modern electronic circuits.

LIMMs use a multi-folded flex circuit as a drive-coil. Depending on the application, the drive-coil can be folded from 5-40 times. In order to fold a flex circuit this many times, while keeping it dimensionally stable, one must choose the proper dielectric laminate base material; adhesive; conductor material; conduct cross-section; geometry of the folds or bends in the flex circuit drive coil; forming temperature at which to fold the FPC; and dwell time used during forming.

Current flex circuits are made out of many materials, most notably polyimide, Liquid Crystal Polymers ("LCP"), PET (polyethylene terephthalate), and PEN (polyethylene naphthalate). The primary material difference between the base dielectrics is their Glass Transition Temperature, Tg; mass; moisture uptake; and tensile strength. The glass transition of a polymer matrix composite is a temperature-induced change in the matrix material from the glassy to the rubbery state during heating, or from a rubber to a glass during cooling. For our purposes, it is very important that the drive coil not exceed the laminate base dielectric's Glass Transition Temperature.

At least initially, a quick survey of material properties yields four potential materials for a LIMM drive coil: polyimide, PET, LCP and PEN, although it is clearly easy to enumerate other such materials. The most common base dielectric material is polyimide, known by its tradename of Kapton®. Polyimide is currently used as a former in traditional wound-wire drive-coils, such as loudspeaker voice coils. Polyimide has excellent temperature stability and tensile strength, and comes in many very low mass configurations (e.g., Sheldahl/Multek's Novaclad® is an adhesiveless polyimide solution). However, polyimide has a significant amount of memory after it is folded or formed, especially when cold-formed, and it has poor water uptake property (it is relatively hygroscopic). Although water uptake is of minor importance in many applications of LIMMs, it is of chief interest in certain applications such as automotive. First generation LCPs were not suitable for LIMM applications, because they were too rigid. However, advances over the last five years in the processing of LCPs have made them an excellent choice for dimensional stability, thickness, tensile strength and temperature stability. LCPs are, by far, the most expensive material under consideration, so they are not necessarily appropriate for mass-market or economical applications. PET has the lowest Glass Transition Temperature, at approximately 100° C., of all the materials. However, if the thermal rise of the LIMM is kept to 20° C.-30° C., PET is ideal in many applications, because it can be thermoformed after it is etched, screened, or deposited with copper. This allows it to be more dimensionally stable. PEN has high tensile strength, low water uptake, good dimensional stability, and a Tg of approximately 170° C. PEN is also the most cost effective material, but is relatively heavy, as processed, to date. PEN is not thermoformable, but has less memory than polyimide.

There are two general categories of adhesives for flexible circuits: thermosetting and thermoplastic. Adhesive adds weight to the application, so, regardless of the base substrate, the interlayer adhesive should be the minimum that will hold the layers together. Several types of thermosetting adhesives can be used to create laminates with the base dielectric materials, as well as bonding metal foils to the dielectric substrate. Typically, the adhesive is the limiting factor in the construction of a flex circuit laminate.

Some examples of potential adhesives are polyimide epoxies, acrylic adhesives, and polyester epoxies. Due to limitations with polyimide adhesives, many flex circuits constructed with a polyimide base use adhesives from different polymeric families. New polyimide adhesives exist for flex circuits, which overcome some of the common criticisms previously made about this class of adhesives. New technology also allows for PI laminates to be constructed without adhesive. Acrylic adhesives have excellent bonding strength and dimensional stability. However, acrylics are stiff and thermally reactive. Current acrylic adhesives are widely used in flexible circuit laminates using polyimide as a dielectric material, due to the relative drawbacks of polyimide adhesives, but are inappropriate in LIMM applications due to their stiffness. Like acrylics, polyester epoxies have excellent bonding strength and dimensional stability. Polyester epoxies also have good thermal properties and do not make stiff laminates. However, polyester epoxies are brittle and relatively hygroscopic.

Some magnetic motor applications, such as loudspeaker transducers, use aluminum, as well as copper, drive coils. In high-quality loudspeaker transducers, aluminum, rather than copper, wire is preferred, both for its weight and resistivity. Still, most traditional electro-dynamic loudspeaker transducers use wound-wire drive coils, called voice coils, made from copper. Flex circuits are available using a wide variety of conductors, including, but not limited to, electro-deposited copper, annealed rolled copper, electro-deposited aluminum, and electro-deposited silver. Electro-deposited silver is not materially or operationally superior to electro-deposited aluminum. Rolled annealed copper is more flexible in the grain direction, but far more brittle in the cross direction, meaning that it is not really suitable for a LIMM. Aluminum is brittle, and Aluminum traces are not robust in applications requiring significant bending or folding.

The conductor traces on the flex circuit can be made in a variety of widths and heights. For a flex circuit implementation of a linear magnetic motor drive coil, the ability to create traces in both series and parallel configurations allows the capability to control the overall system impedance with something other than the resistivity of the conductor (i.e., wire gauge). As a result, large cross-section and small cross-section conductors can be designed in such a way as to yield the same overall system impedance.

BRIEF DESCRIPTION OF THE DRAWINGS

There are twenty-three relevant drawings.

DETAILED DESCRIPTION OF THE PREFERRED EMBODIMENTS

The following description represents the inventor's current preferred embodiment. The description is not meant to limit the invention, but rather to illustrate its general principles of operation and construction. Examples are illustrated with the accompanying drawings.

Figure 1:
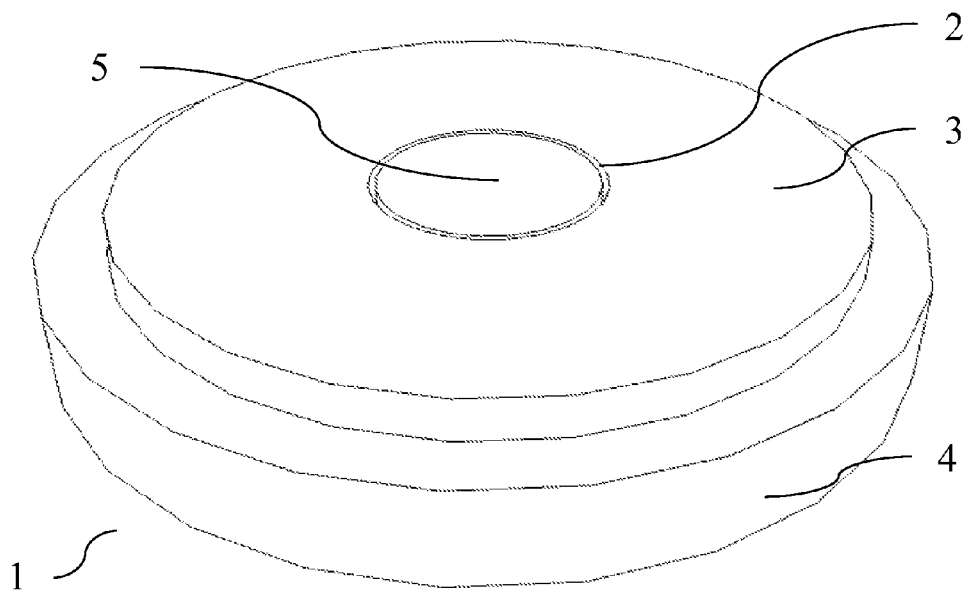
FIG. 1 is a perspective view of a traditional linear magnetic motor cell (a magnetic motor without drive coil), such as would be used in a loudspeaker transducer.
Figure 2:
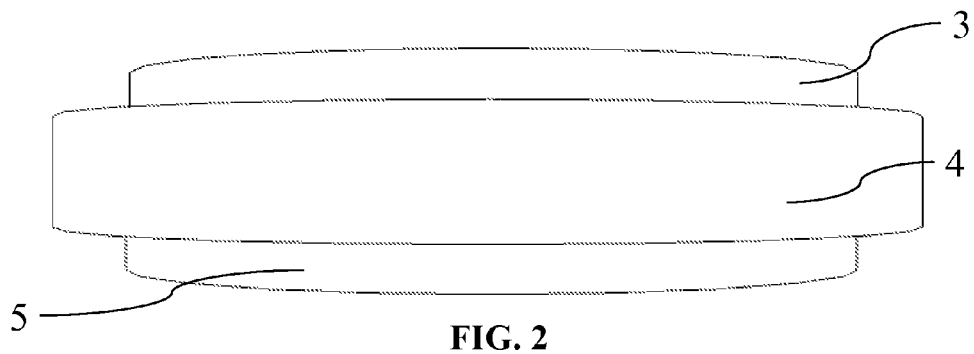
FIG. 2 is a side view of a traditional linear magnetic motor cell, such as would be used in a loudspeaker transducer.

Before describing the preferred embodiment of the claimed invention, this application will provide a brief description of currently existing technology, so that it can be compared and contrasted to the claimed invention. FIG. 1 shows a traditional linear magnetic motor cell 1, comprised of a ferrous top plate 3, a ferrous integral back plate and pole piece 5, and a permanent magnet 4. The two ferrous elements 3, 5, are arranged to create a narrow, symmetrical, magnetic air-gap 2, which will have a concentrated B-field. FIG. 2 shows a lateral view of the traditional linear magnetic motor cell with ferrous top plate 3, ferrous integral back plate and pole piece 5, and a permanent magnet 4.

Figure 3:
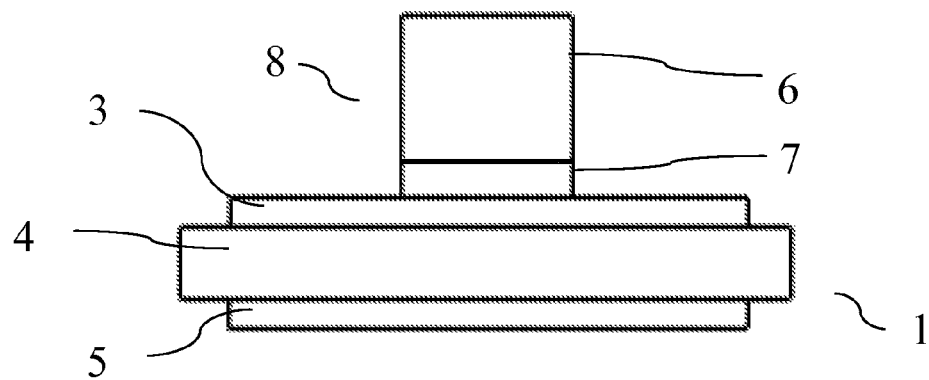
FIG. 3 is a side view of a traditional linear magnetic motor, with drive coil.
Figure 4:
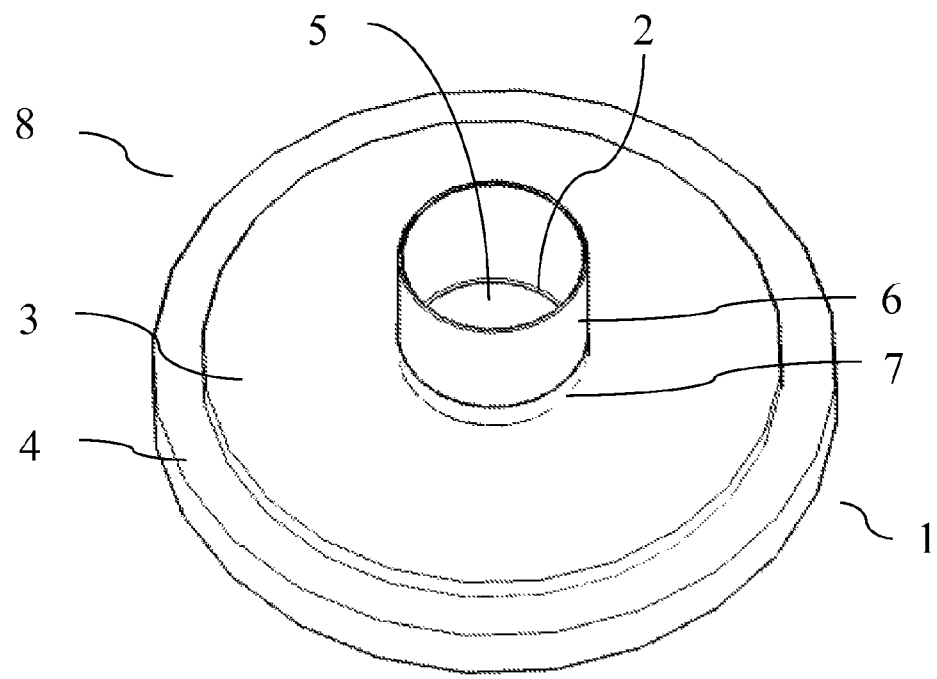
FIG. 4 is a perspective view of a traditional linear magnetic motor, with drive coil.

FIG. 3 shows a traditional linear magnetic motor 8. The traditional linear magnetic motor 8 is comprised of the motor cell elements 1, a ferrous top plate 3, a ferrous integral back plate and pole piece 5, and a permanent magnet 4. Additionally, the traditional linear magnetic motor has a drive coil comprised of a former 6 and its windings 7. FIG. 4 gives a perspective view of the drive coil 6, 7, in the narrow air-gap 2. The drive coil 6, 7, will move up in down in the air-gap 2 in relationship to an applied current. This topology is used not only in loudspeaker transducers, but, with some scaling, in vibration tables and paint shakers.

Figure 5:
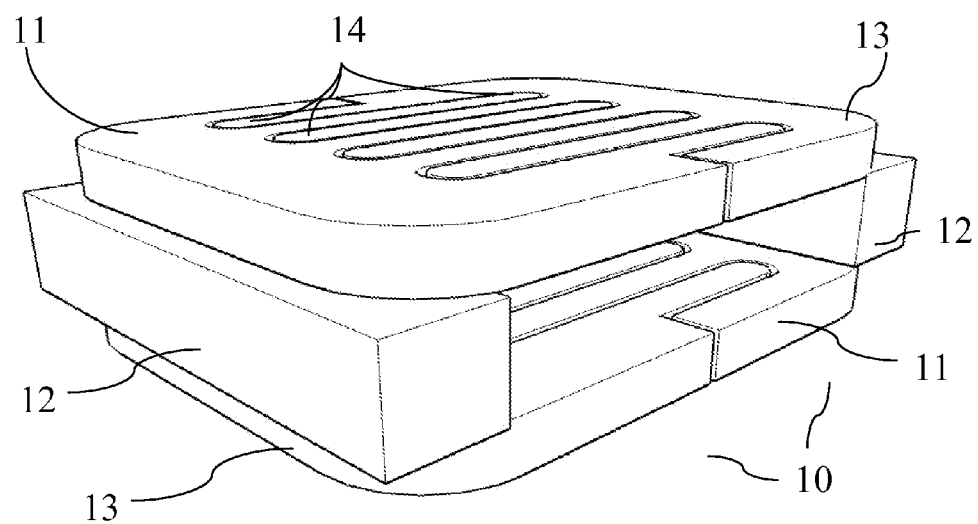
FIG. 5 is a perspective view of two linearly interleaved motor cells.
Figure 6:
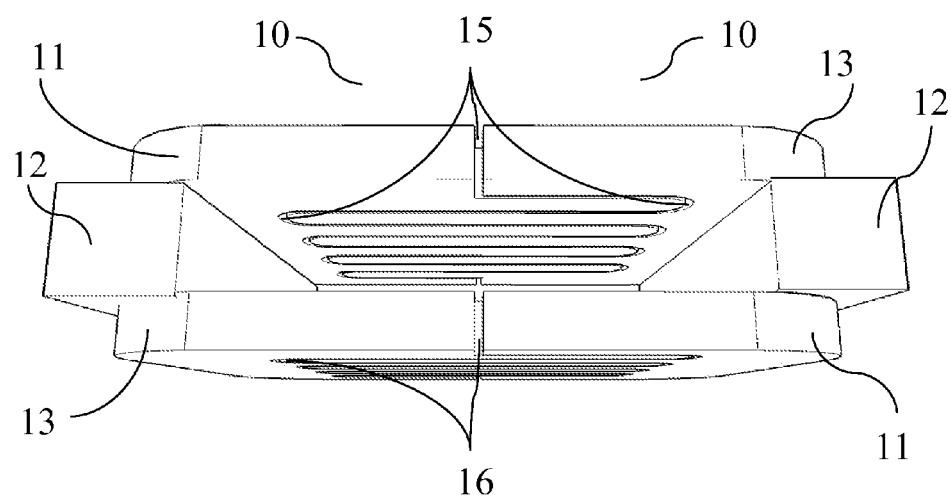
FIG. 6 is a lateral view of two linearly interleaved motor cells.
Figure 7:
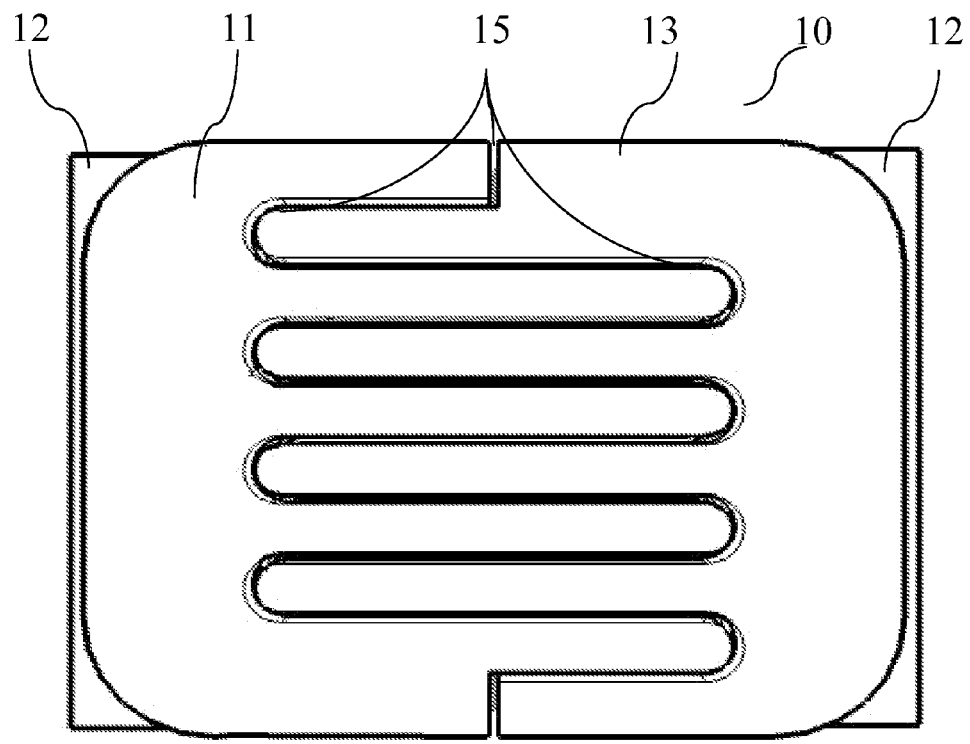
FIG. 7 is a top view of two linearly interleaved motor cells.
Figure 8:
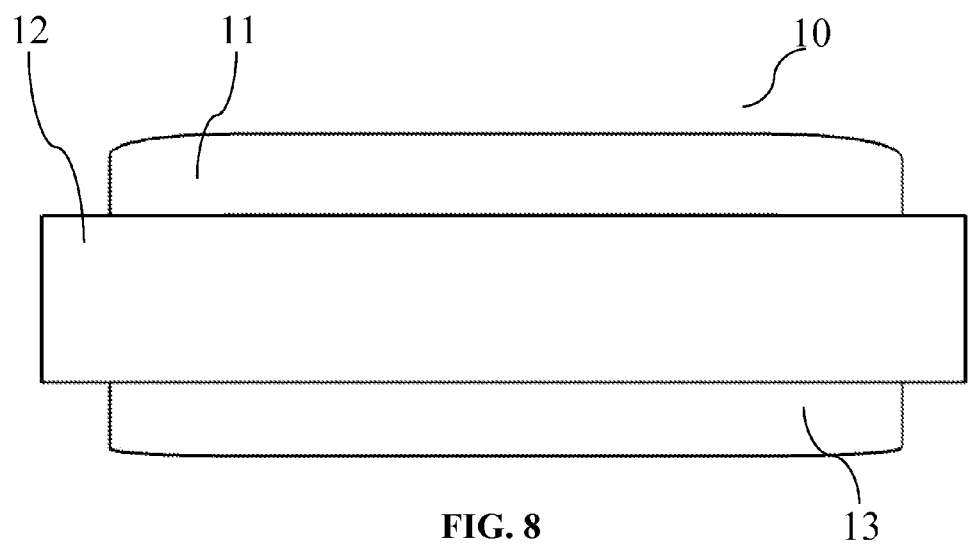
FIG. 8 is a side view of a linearly interleaved motor cell.

FIG. 5 shows two linearly interleaved magnetic motor cells 10. Each cell is comprised of a permanent magnet 12, a ferrous member 11 connected to the north pole of the magnet, and a ferrous member 13 connected to the south pole of the magnet. The ferrous members have a plurality of fingers or fins 14. FIG. 6 shows the linearly interleaved magnetic motor cells 10 from a lateral view. From this view, it is easy to see that the air-gap between the north arm 11 and south arm 13 of an individual motor cell 10 is much greater than the air-gap between the two motor cells 10. In this way, most of the B-field is distributed, more or less evenly, across the narrow top air-gap 15 and bottom air-gap 16 between the individual motor cells 10. The magnetic flux in the top air-gap 15 is the inverse of that in the bottom air-gap 16. FIG. 7 shows a top view of the top air-gap 15. FIG. 8 shows a the side-lateral view of the interleaved motor cells 10.

Figure 9:
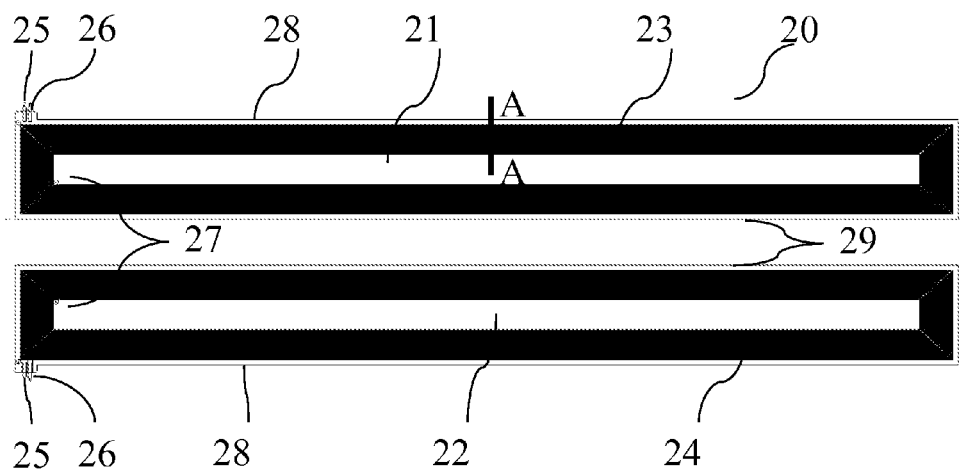
FIG. 9 is a top view of two layers of a laminated flexible printed circuit.
Figure 10:
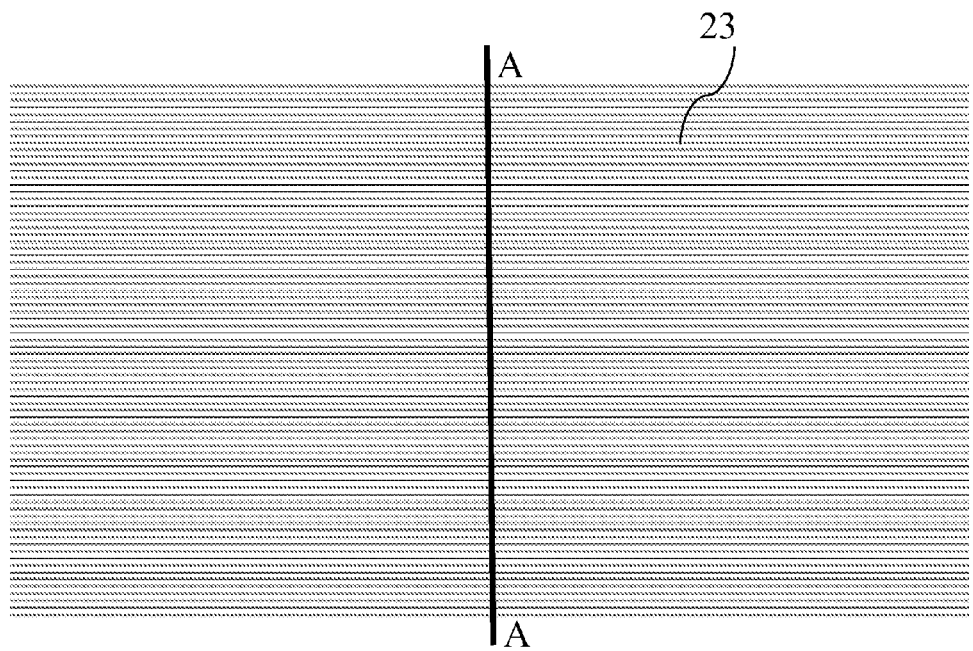
FIG. 10 is a close-up of the FPC from FIG. 9.

FIG. 9 shows a two conducting layers of a flexible printed circuit 20. The flexible printed circuit 20 has two sides, the front-side 21 and the back-side 22. The flexible printed circuit 20 has a top edge 28 and a bottom edge 29. On the top-edge 28 of the front-side 21, one continuous trace starts from one lug 26, and continues, clockwise, around the periphery of the circuit 23, until it arrives at the inner most part of the trace, at a via 27. The via connects the continuous trace to the other side 22. On the paper, the trace continues on this side 22 in a counter-clockwise fashion 24. When the two halves 21, 22 are bonded together, current flows in the same direction through the traces on the top edge 28 of both sides 21, 22, and through the traces on the bottom edge 29. FIG. 10. shows that, at Line A-A, the trace 23 density is quite high. Modern flex circuits can be made with space and trace as small as 3 mil (i.e., the state of the art for thin traces on a FPC are currently a trace of 0.003" and a spacing of 0.003"). More typical values of space and trace are 5-10 mil, depending on the weight of the conductor. FIG. 10 shows a 6 mil space and trace on a 0.6" track, yielding 50 conductors 23, with 1 oz./sq. ft. ED copper.

Figure 11:
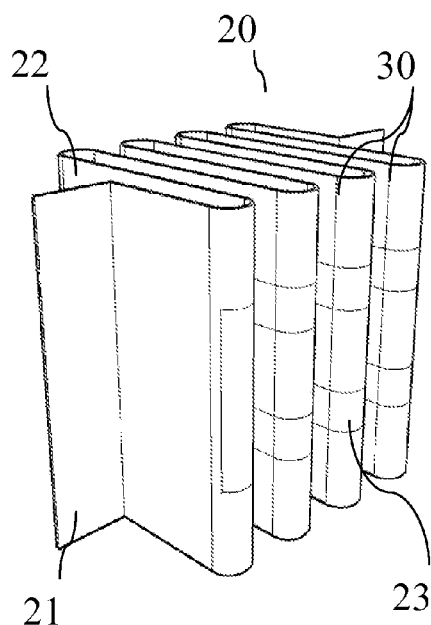
FIG. 11 is a perspective view of a FPC that has been folded eight times.

Referencing FIG. 11, the FPC 20 can be folded using a forming fixture. The substrate of the front-side 21 can be fixed in one of two ways. First, some materials, such as PET, will thermoform at temperatures between 60° C. and 100° C. Second, depending on the thickness of the substrate 21, the copper in the traces 23 can fix the FPC. The second method only works with thin polyimides. The first method works with most substrates 21, but works best on PET.

Figure 12:
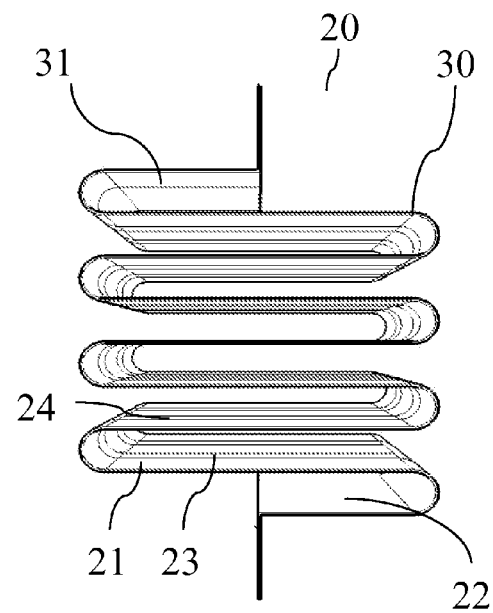
FIG. 12 is a top view of a FPC that has been folded eight times.
Figure 13:
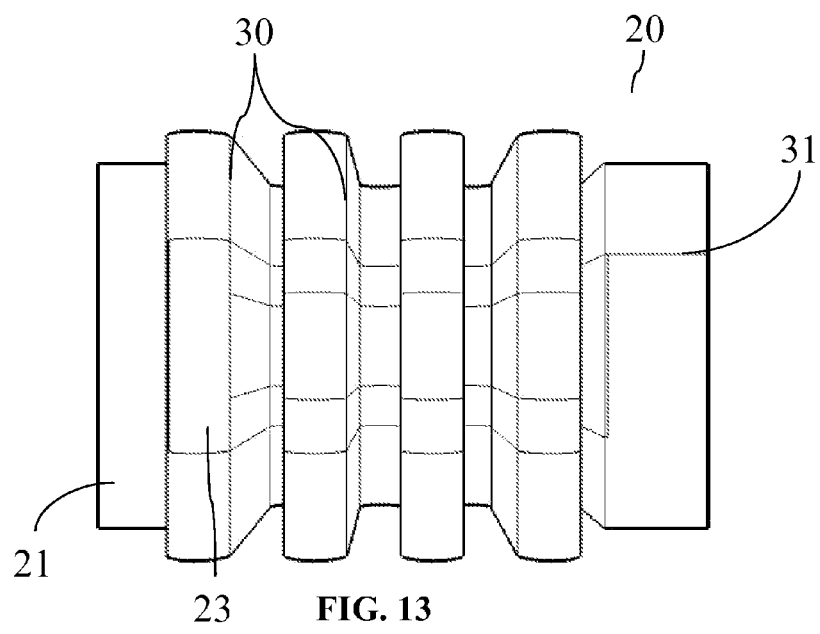
FIG. 13 is a lateral view of a FPC that has been folded eight times.

In FIG. 12, the folded FPC 20 is shown from the top. Both sides of the traces 23, 24 and both sides of the substrate 21, 22 are visible. Contour lines 30 are included to provide visual cues, although they are not an apparent attribute on the actual FPC 20. The lead trace 31 leading to the lug 26 is also shown. FIG. 13 shows the front view of the folded FPC 20. The front-side substrate 21 and traces 23 are visible, as is the lead trace 31. The contour lines 30 are once again added for visual clarity.

Figure 14:
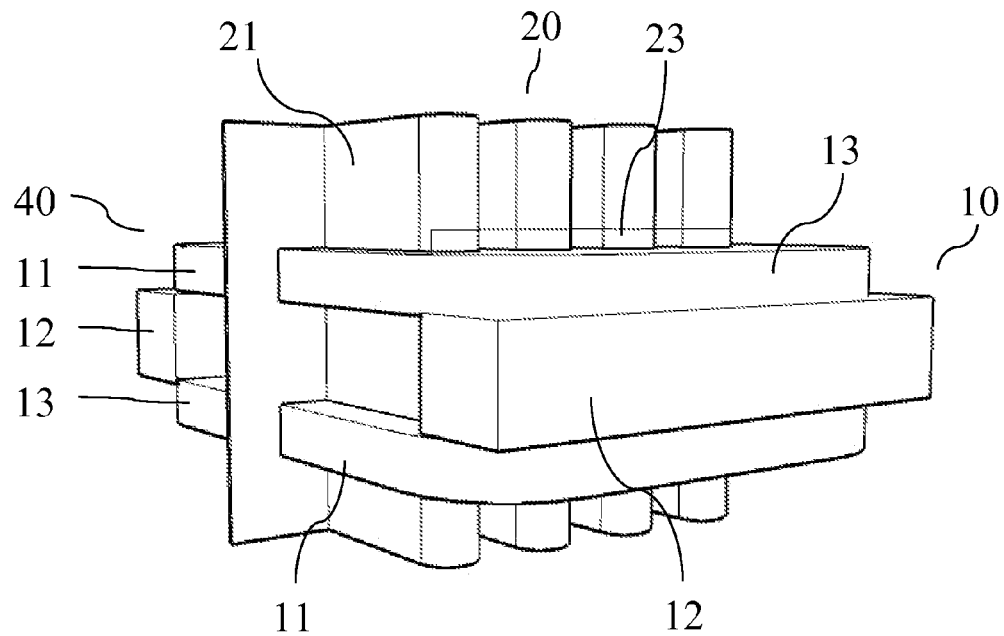
FIG. 14 is a perspective view of a complete LIMM.
Figure 15:
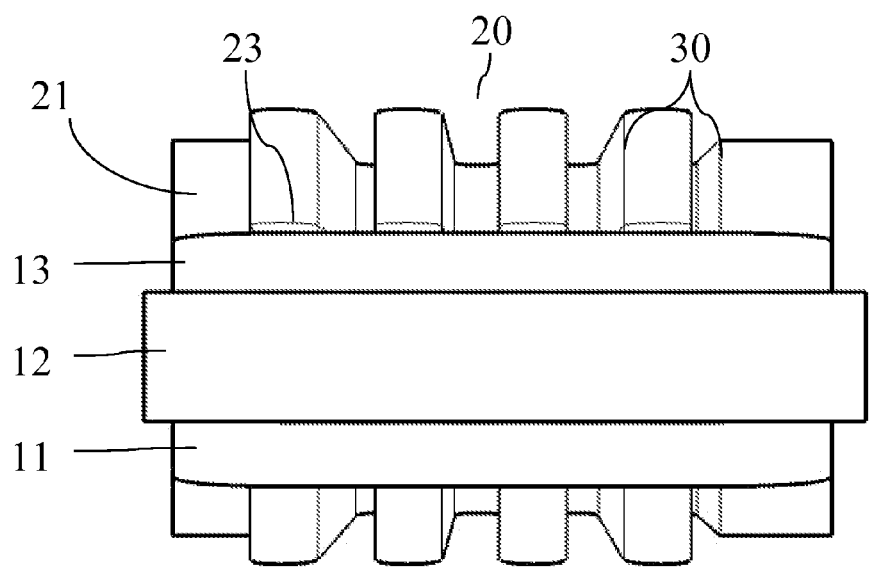
FIG. 15 is a lateral view of a complete LIMM.
Figure 16:
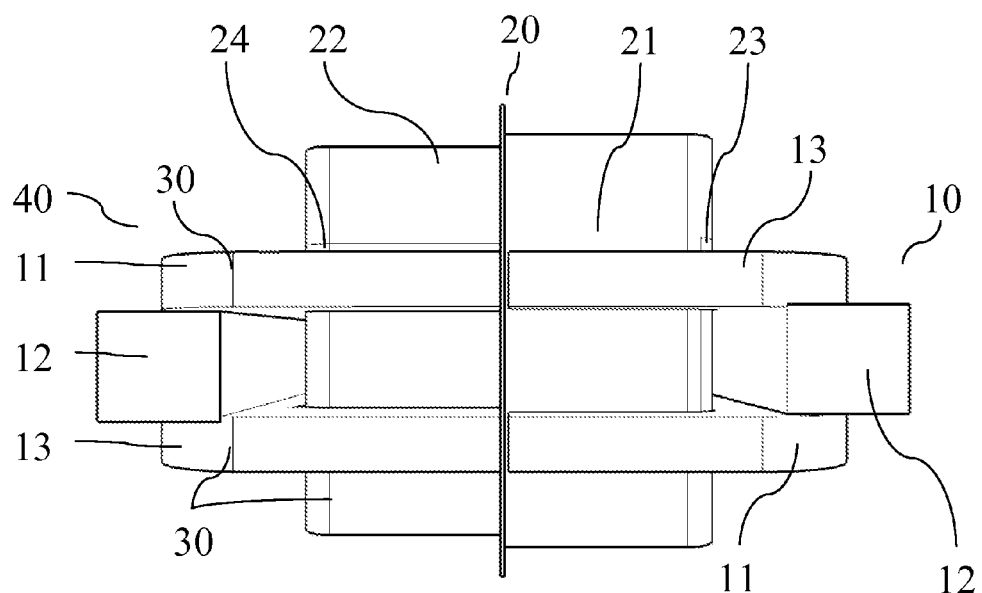
FIG. 16 is an alternative lateral view of a complete LIMM.
Figure 17:
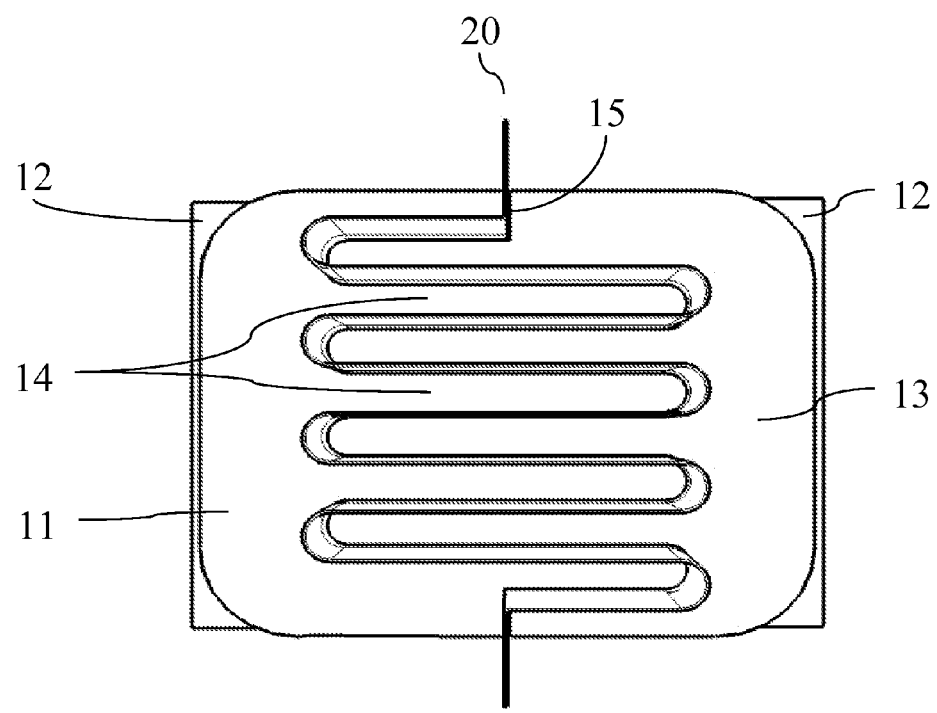
FIG. 17 is a top view of a complete LIMM.

FIG. 14 shows the complete LIMM 40, with the folded FPC 20 placed in the air-gap 15, 16 (not shown in FIG. 14) of the interleaved motor cells 10. The magnet 12, north arms 11, and south arms 13 are all oriented as before. The front side of the FPC substrate 21 and the front side traces 23 are shown. FIG. 15 shows a lateral view of the same. FIG. 16 shows another lateral view, rotated 90° from the previous picture. Again, the magnets 12, north arms 11, south arms 13, front-side substrate of the FPC 21, and the front-side traces of the FPC 23 are all visible. Additionally, the back-side substrate 22 and traces 24 are also visible. Additionally, reference contour lines 30 have been added. FIG. 17 shows the LIMM 40 from the top. The FPC 20 can be seen oriented in the narrow top-side air-gap 15. The magnets 12, the top-side north arm 11 and the top-side south arm 13 are all visible.

Figure 18:
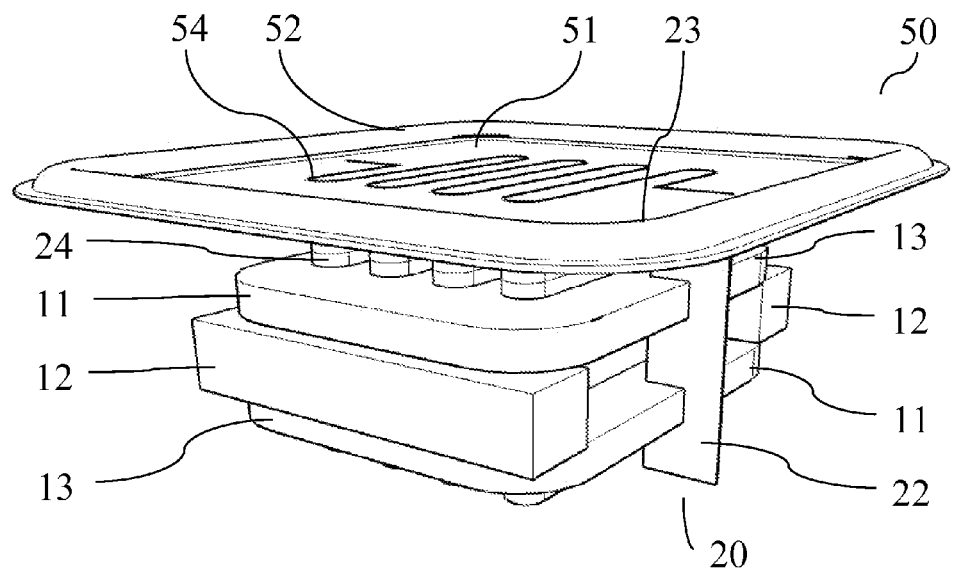
FIG. 18 is a perspective view of a loudspeaker transducer using a LIMM.
Figure 19:
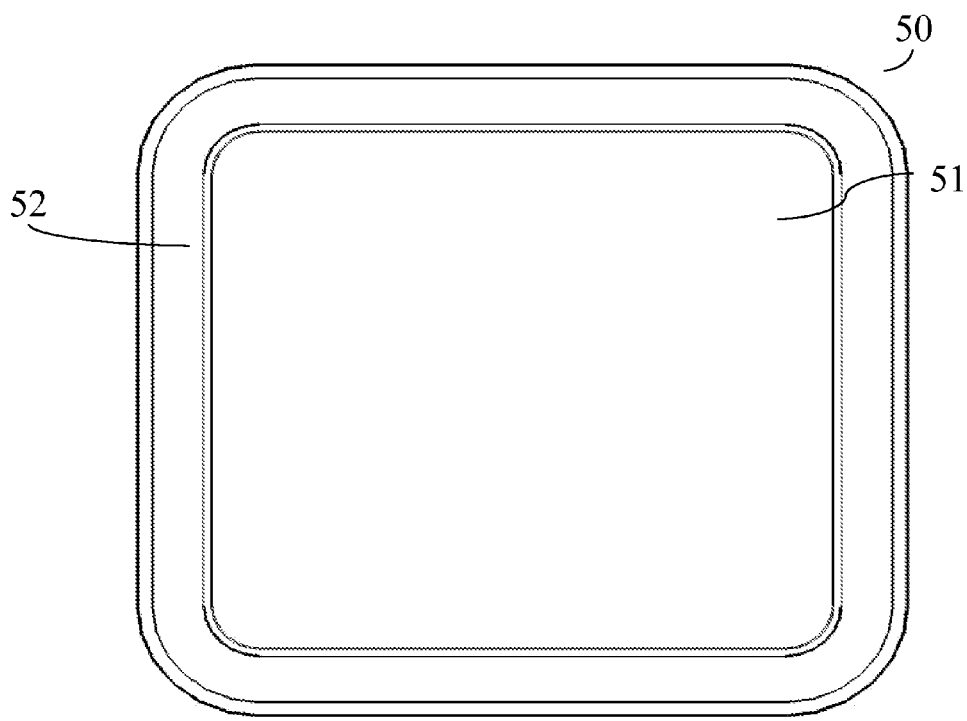
FIG. 19 is a top view of a loudspeaker transducer using a LIMM.
Figure 20:
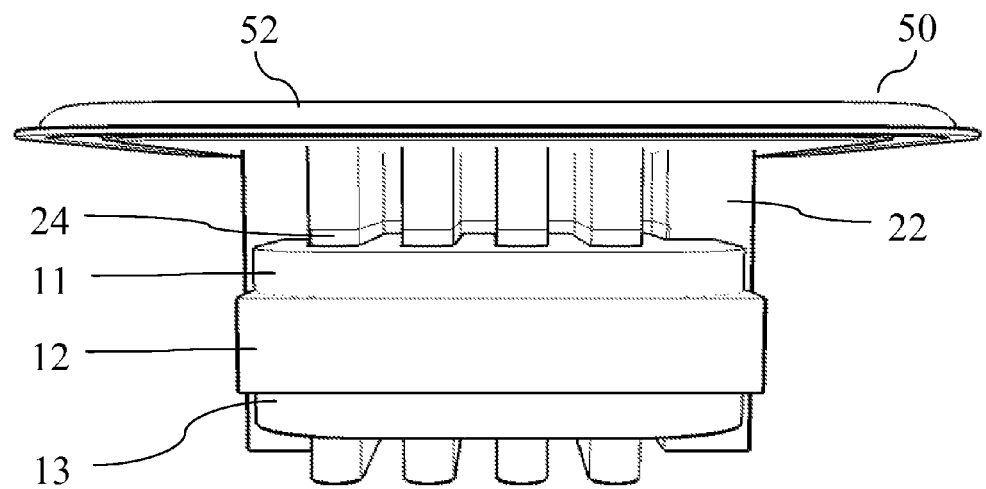
FIG. 20 is a lateral view of a loudspeaker transducer using a LIMM.
Figure 21:
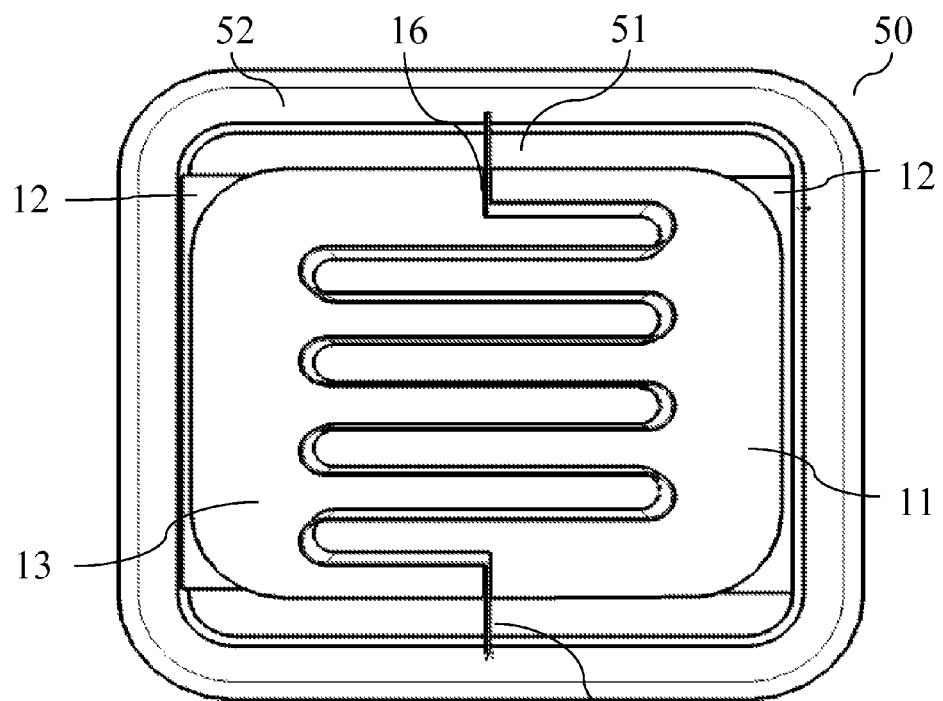
FIG. 21 is a bottom view of a loudspeaker transducer using a LIMM.

FIG. 18 shows the LIMM 40 converted into a loudspeaker transducer 50. A simple diaphragm 51 is attached to the top edge 28 (not visible in FIG. 18) of the FPC 20. The diaphragm has been pressed with a shallow impression 54 of the FPC top edge 28. This helps to center the FPC 20 in the top and bottom air-gaps 15, 16 (not visible in FIG. 18). The diaphragm 51 is attached to a flexible surround 52. The flexible surround 52 acts to both fix the transducer to the housing (not shown) and as a suspension. From this view, both magnets 12, both south arms 13, both north arms 11, the back-side substrate 22, and the back-side traces 24 are visible. FIG. 19 shows a top view of an alternative embodiment of the loudspeaker transducer 50, without the shallow centering impression 54. The diaphragm 51 and surround 52 are the only two visible components. FIG. 20 shows a lateral view of the loudspeaker transducer 50. The surround 52, back-side substrate 22, back-side traces 24, magnet 12, south arm 13, and north arm 11 are all visible. FIG. 21 is a bottom view of the loudspeaker transducer 50. From the bottom, the underside of the surround 52 and the diaphragm 51 are visible. Additionally, the bottom-side north arm 11, bottom-side south arm 13 and both magnets 12 are visible. The FPC 20 is centered in the bottom air-gap 16.

Figure 22:
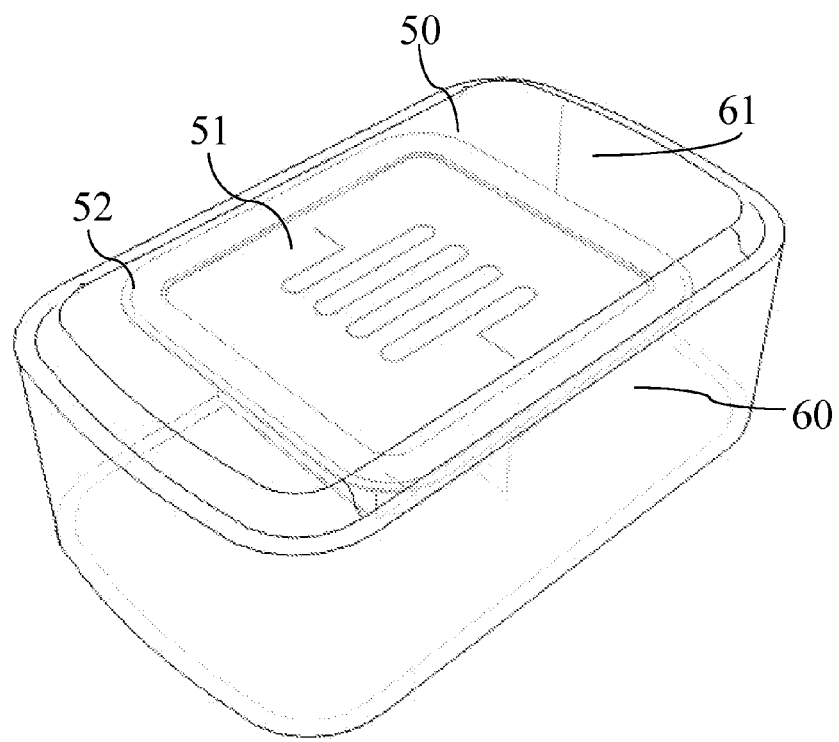
FIG. 22 is a partially transparent perspective view of a loudspeaker transducer using a LIM, in an integral housing.

In FIG. 22, the loudspeaker transducer 50 is placed in a housing 60, with an acoustically transparent screen or grille 61. The transducer 50 rests on an internal baffle (not shown), to keep the front waves and back waves of the diaphragm 51 and surround 52 from cancelling one another. The housing 60 shown is sealed, creating an acoustic suspension enclosure.

Figure 23:
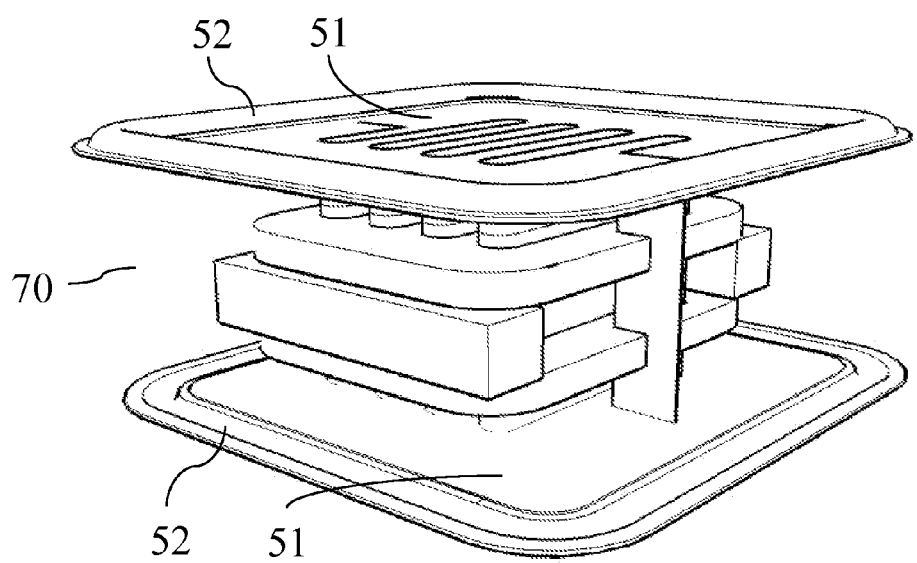
FIG. 23 shows an alternative loudspeaker transducer using a LIMM.

FIG. 23 shows an alternative embodiment of the loudspeaker transducer, called a dipole 70. The dipole 70 has two diaphragms 51 and two surrounds 52. The dipole 70 is suited for use in a ported housing (not shown), creating a bass-reflex enclosure.

I claim:

1. A linearly interleaved magnetic circuit, comprised of at least two motor cells, each motor cell being comprised of a magnet, a North Arm, and a South Arm, said North Arm and South Arm each being a planar ferrous metal element with a plurality of fingers or fins in which a B-Field is routed back-and-forth between the motor cells through said plurality of fins on said North Arm and South Arm, creating at least two long, serpentine, air gaps, said air-gaps allowing for reciprocal motion, both above and below the air gaps.

2. The invention in 1, in which there are two motor cells, with interleaved fins or finders, defining a top gap and a bottom gap.

3. A linearly interleaved magnetic motor, comprised of the invention in 1 along with at least one flexible printed circuit drive coil, which is bent or folded to fit into the long, serpentine, air gap.

4. A linear interleaved magnetic motor, comprised of the invention in 2, along with a flexible printed circuit drive coil, which is bent or folded to fit, simultaneously, into the long, serpentine, top and bottom air-gaps.

5. The invention in 3, in which the flex circuit dielectric is PET, PEN, polyimide, or LCP.

6. The invention in 3, in which series and parallel connections in the flex circuit are used to achieve the designer's targeted direct current resistance target.

7. The invention in 3, in which the flex circuit has two or more layers.

8. The invention in 3, in which an inductance of the flex circuit drive circuit is minimized by using ground planes, ground loops, or the geometry of the folded flex circuit, itself.

9. The invention in 3, in which the flex circuit drive coil is centered in the gap by having a plurality of trace segments, which run parallel with the direction of motion, or a Lorentzian Force, F.

10. A loudspeaker transducer, using a linear interleaved magnetic motor as described in 4.

11. A loudspeaker system made up of a plurality of transducers as described in 10.

12. The invention in 11, in which the loudspeaker wiring for multiple channels is included in an integral housing with each loudspeaker transducer.

13. The invention in 12, in which the loudspeaker transducers are mounted on a common frame, with corner pieces that dictate which channel of amplifier information is fed to a particular grouping of loudspeaker transducers.

14. The invention in 11, in which the loudspeaker transducers has a direct current resistance that is high enough that several transducers may be connected in parallel, achieving a direct current resistance on a single amplifier channel of no more than 10 ohms.

15. The invention in 10, in which the flex circuit conductor is made out of copper.

16. The invention in 10, in which the flex circuit conductor is made out of aluminum.

17. The invention in 10, in which the flex circuit conductor is made out of etched copper.

\* \* \* \* \*